United States Patent [19]

Takatori

[11] Patent Number: 5,287,431
[45] Date of Patent: Feb. 15, 1994

[54] NEURAL NETWORK USING LIQUID CRYSTAL FOR THRESHOLD AND AMPLIFIERS FOR WEIGHTS

[75] Inventor: Sunao Takatori, Tokyo, Japan
[73] Assignee: Yozan, Inc., Tokyo, Japan
[21] Appl. No.: 77,966
[22] Filed: Jun. 18, 1993

Related U.S. Application Data

[63] Continuation of Ser. No. 871,709, Apr. 21, 1992, abandoned.

[30] Foreign Application Priority Data

Apr. 26, 1991 [JP] Japan ................... 3-125189

[51] Int. Cl.$^5$ ............... G02F 1/135; G02F 1/1343; G02F 15/18
[52] U.S. Cl. ........................ 395/25; 359/72; 359/56; 364/822
[58] Field of Search ............ 359/36, 62, 72; 307/201; 395/25; 364/822

[56] References Cited

U.S. PATENT DOCUMENTS

| | | | |
|---|---|---|---|
| 3,599,209 | 10/1971 | Goodrich | 364/822 |
| 3,638,006 | 1/1972 | Hogan | 364/822 |
| 4,427,978 | 1/1984 | Williams | 359/59 X |
| 4,544,230 | 10/1985 | Caulfield | 364/822 |
| 4,873,455 | 10/1989 | de Chambost et al. | 307/201 |
| 4,908,876 | 3/1990 | DeForest et al. | 359/36 X |
| 4,988,891 | 1/1991 | Mashiko | 359/54 X |
| 5,008,833 | 4/1991 | Agranat et al. | 364/807 |
| 5,028,969 | 7/1991 | Kasahara et al. | 395/25 |
| 5,056,897 | 10/1991 | Akiyama et al. | 359/72 |
| 5,068,801 | 11/1991 | Clark et al. | 395/25 |
| 5,071,231 | 12/1991 | Armitage et al. | 359/72 X |
| 5,095,459 | 3/1992 | Ohta et al. | 364/822 |
| 5,121,228 | 6/1992 | Paek | 395/25 |
| 5,168,382 | 12/1992 | Tsujikawa | 359/56 |
| 5,212,377 | 5/1993 | Rosan | 395/25 |
| 5,220,644 | 6/1993 | Horan et al. | 395/25 |

FOREIGN PATENT DOCUMENTS 0405974 6/1990 European Pat. Off. .

OTHER PUBLICATIONS

Efron, "Spacial Light Modulators for Optical Computing and Information Processing", Proceedings of the 22nd Annual Hawaii Int Conf., Jan. 1989, pp. 416–423, vol. 1.

Scientific American: Special Issue of Optical Technology—Light Transmission and Information Processing, Nikkei Science, Inc., pp. 90–101, Jun. 25, 1988.

Electronic Design, vol. 37, Johna Till, "Optoelectronic Scheme Opens Doors for Neural Nets", Jun. 8, 1989, No. 12, p. 27, Hasbrouck Heights, New Jersey.

Primary Examiner—William L. Sikes
Assistant Examiner—Kenneth Parker
Attorney, Agent, or Firm—Cushman, Darby & Cushman

[57] ABSTRACT

A neural network type data processing system in which an optical input is received and a normalized optical output is generated. A plurality of light receiving regions of a photovoltaic material generate signals which are fed into amplifiers and summed. The gain of the amplifiers represent the synaptic weights. The output the summed amplified signals is then sent to a portion of a liquid crystal light valve where that portion of the liquid crystal light valve is used to produce a normalized light output.

4 Claims, 2 Drawing Sheets

NEURAL NETWORK USING LIQUID CRYSTAL FOR THRESHOLD AND AMPLIFIERS FOR WEIGHTS

This is a continuation of application Ser. No. 07/871,709, filed on Apr. 21, 1992, which was abandoned upon the filing hereof now abandoned.

BACKGROUND OF THE INVENTION

1. Field of the Invention

The present invention relates to a data processing system which is modeled on the function of neural cells in the brain of an organism, called a "neural network type" system.

2. Discussion of the Prior Art

A data processing system of the so-called "neural network type" has a large number of data lines. Consequently, it can form a few neurons because of the restriction of the number of pins, when realized by hardware. It may also be processed by software so as to avoid such restriction, but the processing speed is not fast enough. It was impossible to apply the data processing system of the neural network type to consumers because it necessitated a high speed and large capacity computer.

SUMMARY OF THE INVENTION

The present invention is invented so as to solve the above problems and has an object to provide a data processing system which can form a neural network with high speed processing, consisting of many neurons.

A data processing system according to the present invention gives an input of a two dimensional image pattern to a portion for receiving light made from material with photovoltaic effect, and supplies a part of a liquid crystal panel through an amplifier with the electromotive force generated in each area of the portion for receiving light when it receives the input. The system can be realized with neurons where a plural number of synapses can change in weight by corresponding the plural areas in the light receiving part to one liquid crystal part and by controlling each gain of an amplifier. The amplifier is located between a small area of the light receiving part and a liquid crystal part, for example, and is electrically connected between them. The output of each neuron can detect the light penetrating a part of a liquid crystal panel, for example.

The data processing system of the present invention makes it possible to process a lot of data because the data is input and output by two dimensional image data. It also makes it possible to process it at high speed because the processing is executed electrically.

DETAILED DESCRIPTION OF THE PREFERRED EMBODIMENTS

Hereinafter, an embodiment of the data processing system according to the present invention is described with reference to the attached drawings.

Figure 1:
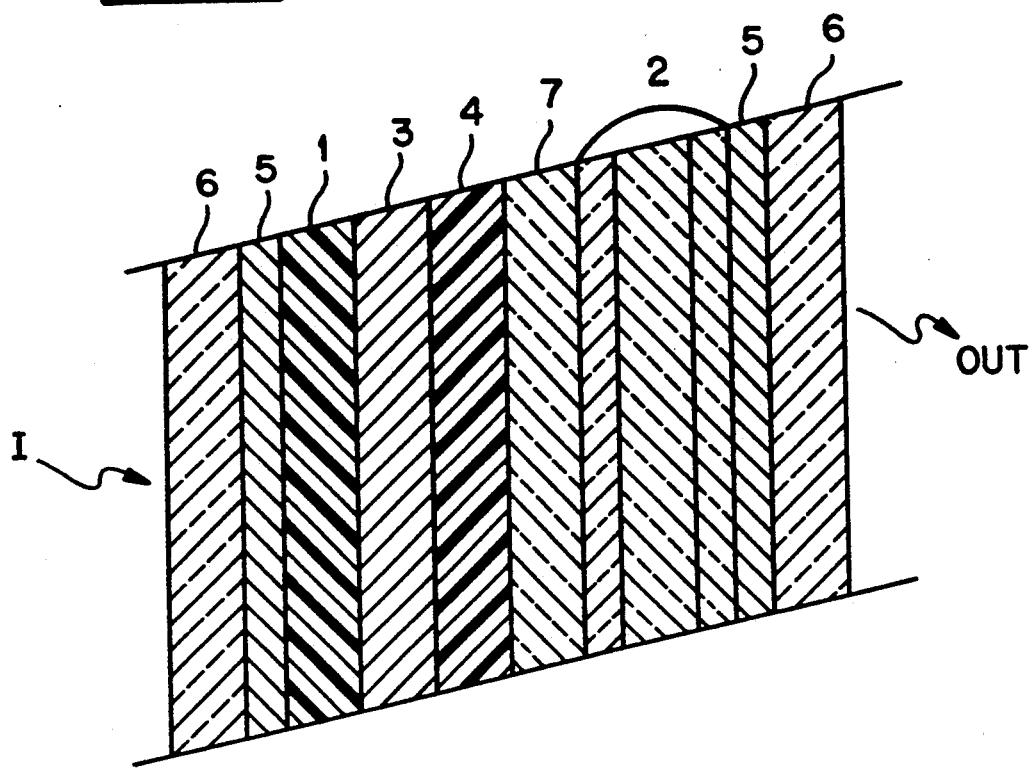
FIG. 1 shows the section of the embodiment of the data processing system which relates to the present invention.

In FIG. 1, the data processing system comprises thin film 1 made from material with photovoltaic effect of a-SiH for example, and liquid crystal panel 2. Each photovaic area of thin film 1 is connected to part of liquid crystal panel 2 through amplifier 3 of the thin film.

Figure 2:
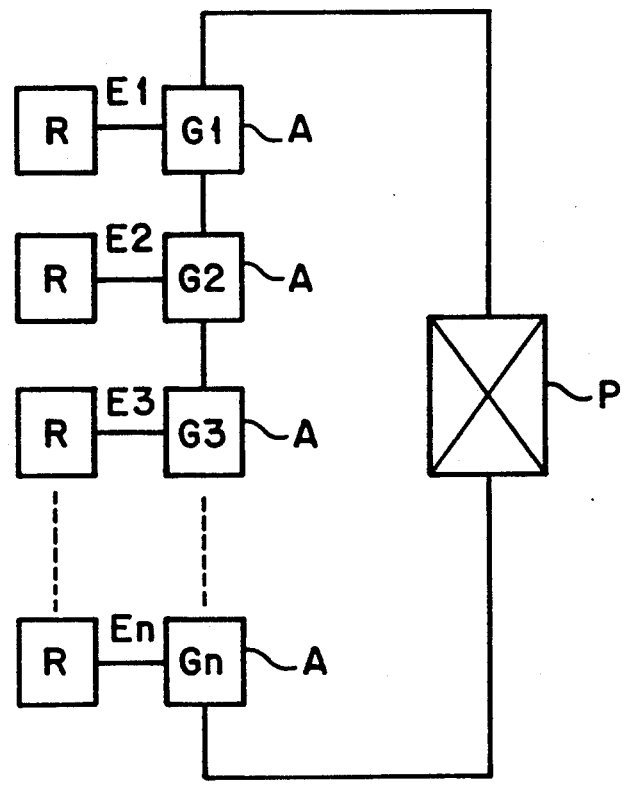
FIG. 2 diagrams a circuit to show the way to supply electric power to a part in the embodiment in FIG. 1.

As shown in FIG. 2, liquid crystal part "P" corresponds to plural areas "R" in thin film 1. The electromotive force in each area is amplified by amplifying circuit A, and amplified voltage is integrated and impressed on part P of liquid crystal panel 2.

Here, assuming the i-th electromotive force to be "Ei", the gain of the amplifying circuit corresponding to the area to be "Gi" and the number of areas connected to part "P" to be "n", the voltage "E" for being impressed on the part is shown by the formula below.

$$E = \sum_{i}^{n} (Ei \times Gi)$$

Part "P" does not generate a change in state unless the electromotive force equal to or more than a predetermined value is impressed. Indicating the existence and inexistence of the change of state by a variable "S" (when "S" is 1, the change of state exists and when "S" is 2, it does not exist), and normalized function by "f( )", the relationship between "S" and "f( )" can be shown as below.

$$S = f(E)$$
$$= f\left\{ \sum_{i}^{n} (Ei \times Gi) - \Theta \right\}$$

Figure 3:
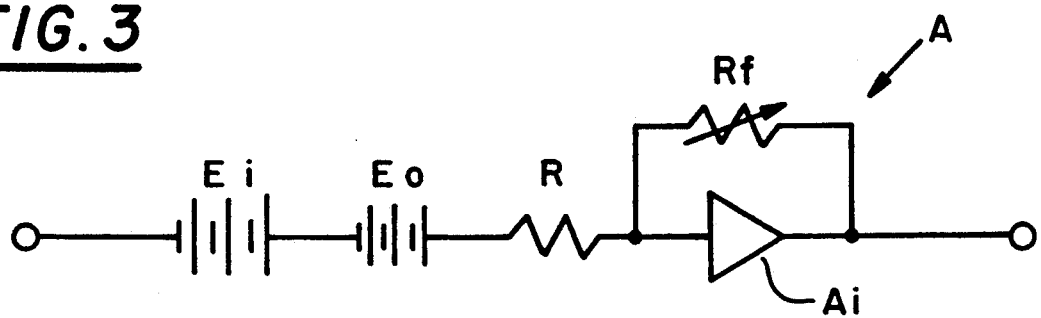
FIG. 3 diagrams an amplifying circuit in the embodiment in FIG. 1.

This formula is equivalent to that of the McClloch and Pitts model which relates to the action of a neuron. It shows that a neuron is formed by the circuit in FIG. 2. As shown in FIG. 3, amplifying circuit "A" connects computation amplifier "Ai" with input resistance "R" and feedback resistance "Rf". A gain corresponding to a synaptic weight is set according to the ratio of these resistances (Rf/R). The feedback resistance is a changeable resistance in order to control the gain. The changeable resistance Rf and a register for setting resistance value (not shown in the figure) are settled in thin film 4 adhered to amplifier 3. Changeable resistance is formed as in FIG. 4, for example.

Figure 4:
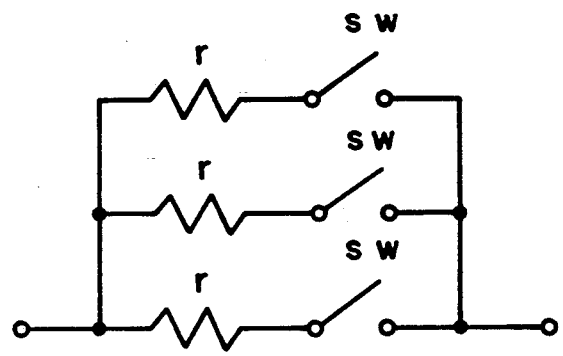
FIG. 4 diagrams a changeable resistance in the amplifying circuit in FIG. 3.

In FIG. 4, changeable resistance Rf consists of a plural number of resistances "r" connected in parallel. Switch "SW", with a node point of contact of a transistor or the like, is connected to the resistance. The number of switches to be disconnected in the switches is registered in the register. The number of switches corresponds to the gain in the amplifying circuit.

Electromotive force "Ei" is impressed on amplifying circuit "A" with bias voltage "Eo". Adding bias of n×Eo to the integrated value "E", a part is surely driven for the predetermined input. The bias voltage Eo is impressed on thin film 1 and lucent electrode 5 which is adhered to liquid crystal panel 2. The whole data processing system is protected by covering both of its outside portions with a glass board 6, for example.

Figure 5:
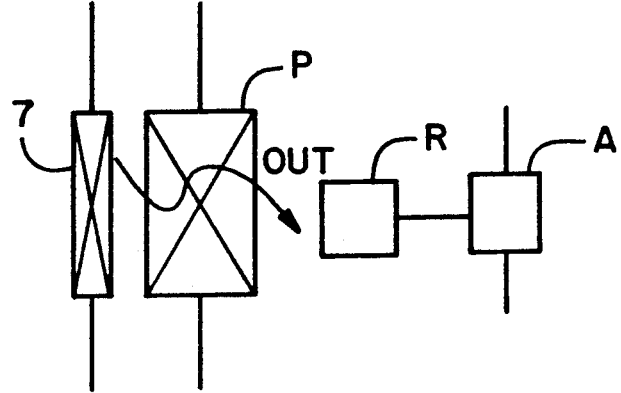
FIG. 5 diagrams a circuit to show a neural network with a plural number of layers formed by the embodiment in FIG. 1.

An input data is input to the data processing system as multiple values of two dimensional image pattern I. Each area of thin film 1 generates electromotive force corresponding to it. The electromotive force is integrated after multiplying it by a gain. When the integrated value exceeds the threshold Θ, the corresponding liquid crystal part is driven. It is possible to process large volumes of data because a two dimensional image pattern can be an input data in this way. The state of each liquid crystal part can be a two dimensional image in the same way. The light of a luminous object 7 of "EL" or the like is penetrated through the liquid crystal panel and can be output as the image generated by penetrated light "Out". When the output light is input to the data processing system in the following step as shown in FIG. 5, a neural network with a plural number of layers can be formed.

When a panel of ferroelectric liquid crystal is used as a liquid crystal panel, it is possible to keep the changed state without supplying electric power, which is advantageous. In this case, a circuit for impressing reverse-bias is necessary so as to return the changed state to the initial state.

As mentioned above, it is possible to process a huge volume of data by the data processing system according to the present invention because the data is input and output by two dimensional image data. It is also possible to process it at high speed because the processing is executed electrically.

What is claimed is:

1. A data processing system modeled on a neural network generating an optical outputs which correspond to normalized weighted sums optical inputs comprising:

light receiving means, including a plurality of light receiving elements, for receiving an optical pattern and each said light receiving element generating a corresponding electrical signal, said light receiving means thereby generating a plurality of electrical signals each capable of assuming any of a range of values;

amplifying means, including a plurality of amplifying units each coupled to said plurality of light receiving elements the gain of which represents weights, respectively, for amplifying each said electrical signal and generating a total amplified electrical signal proportional to a bias voltage of zero or any value plus the sum of said amplified electrical signals; and a liquid crystal structure, including a plurality of liquid crystal elements, wherein one of said liquid crystal elements is energized by said total amplified electrical signal and changes state when said total amplified electrical signal is greater than or equal to a predetermined value effecting a normalized optical response to said total amplified signal.

2. A data processing system as claimed in claim 1, wherein said light receiving means is made from a material having a photovoltaic effect.

3. A data processing system as claimed in claim 1, wherein each said amplifying unit includes a changeable resistor for controlling a gain therein.

4. A data processing system as claimed in claim 1, wherein said liquid crystal structure is a ferroelectric liquid crystal panel.

* * * * *